US012706839B2

(12) United States Patent
Narsian et al.

(10) Patent No.: US 12,706,839 B2
(45) Date of Patent: Aug. 11, 2026

(54) SYSTEM AND METHOD FOR MINIMIZING DATA PACKET LOSS DURING TRAFFIC MIGRATION TO A SOFTWARE DEFINED NETWORKING (SDN) APPLIANCE

(71) Applicant: Microsoft Technology Licensing, LLC, Redmond, WA (US)

(72) Inventors: Anish Sagar Narsian, Cupertino, CA (US); Tao Deng, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 18/644,791

(22) Filed: Apr. 24, 2024

(65) Prior Publication Data

US 2025/0337683 A1 Oct. 30, 2025

(51) Int. Cl.
*H04L 45/586* (2022.01)
*H04L 45/03* (2022.01)
*H04L 45/42* (2022.01)

(52) U.S. Cl.
CPC ............ *H04L 45/586* (2013.01); *H04L 45/03* (2022.05); *H04L 45/42* (2013.01)

(58) Field of Classification Search
CPC ........ H04L 45/586; H04L 45/03; H04L 45/42
USPC .......................................................... 709/238
See application file for complete search history.

(56) References Cited

U.S. PATENT DOCUMENTS 9,424,144 B2 8/2016 Sridharan
11,102,164 B1 8/2021 Gupta et al.
2017/0207992 A1 7/2017 Huang et al.
2018/0287859 A1* 10/2018 Desigowda ........... H04L 41/342
2022/0086091 A1 3/2022 Rosenberg et al.

OTHER PUBLICATIONS

Extended European Search Report received for EP Application No. 25170655.2, mailed on Aug. 7, 2025, 15 pages.

* cited by examiner

*Primary Examiner* — John A Follansbee

(57) ABSTRACT

A method, computer program product, and computing system for processing a request to route network traffic between a virtual network device in a virtual network and a bare-metal electronic device using a software defined networking (SDN) appliance, where the virtual network device includes a virtual machine and an existing direct network connection with a Virtual extensible Local-Area Network (VXLAN) switch coupled to a bare-metal electronic device. An interim shadow mapping policy is installed on the virtual network device configuring the virtual network device to receive outgoing network traffic from a SDN appliance. Outgoing network traffic from the VXLAN switch is redirected to the SDN appliance. A new mapping policy update is installed on the virtual network device for routing incoming network traffic from the virtual network device to the SDN appliance.

20 Claims, 5 Drawing Sheets

FIG. 1

SYSTEM AND METHOD FOR MINIMIZING DATA PACKET LOSS DURING TRAFFIC MIGRATION TO A SOFTWARE DEFINED NETWORKING (SDN) APPLIANCE

BACKGROUND

Users of a remote computing service may be provided with the option of incorporating custom or third-party hardware such as high-capacity processing machines or storage devices into their virtual networks in a cloud computing environment using a cloud provider's services. For example, a bare-metal server may be deployed in a network. A bare-metal server generally refers to a server that is a single-tenant physical server that is not shared between users. Such custom hardware and other hybrid cloud scenarios use software defined networking (SDN) policies to access the cloud provider's services. However, bare-metal servers do not have all the capabilities of a host on the SDN. For example, the bare-metal server may be unable to execute the host networking stack.

Accordingly, a SDN appliance is used to couple a bare-metal server with virtual network devices (e.g., virtual network hosts of various virtual machines, other SDN appliances, network devices, or any other device that participates in virtual networking with a direct network connection with the bare-metal server) deployed in a virtual network of the cloud computing environment. A SDN appliance is a disaggregated host which holds SDN policies for a bare-metal server and virtual network devices, such that the bare-metal server and the virtual network devices do not host SDN policies. The SDN appliance includes all the customer SDN policies (e.g., network security groups, user-defined routes, private link services, etc.) that bare-metal servers are not capable of hosting themselves because they have custom hardware with no capability for enforcing the SDN policies at the bare-metal host itself. As such, a SDN appliance provides this capability with traffic to and from the bare-metal server routed first to a Virtual extensible Local-Area Network (VXLAN) switch that forwards all outbound traffic from the bare-metal server to the SDN appliance.

BRIEF DESCRIPTION OF THE DRAWINGS

Figure 1:
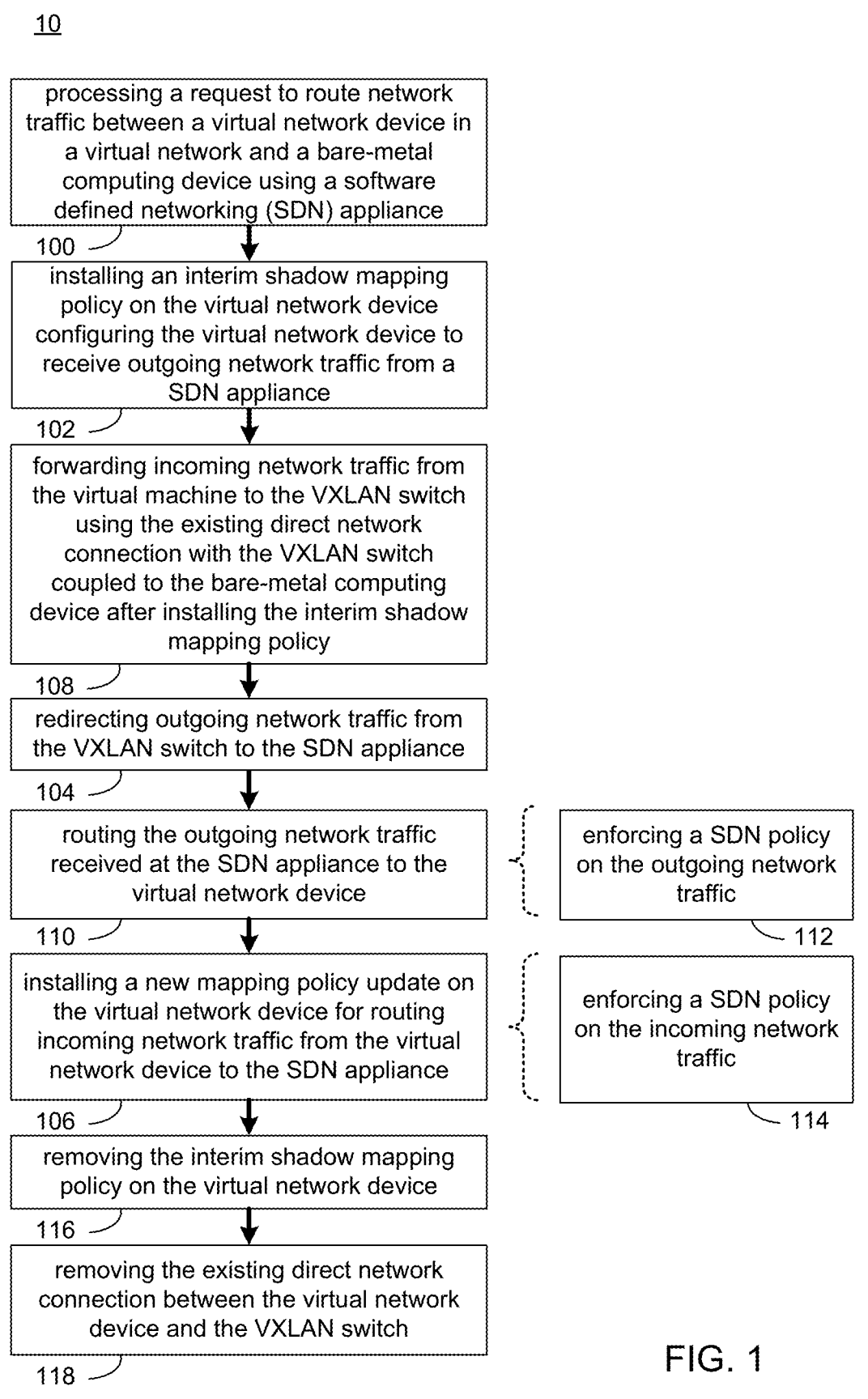

FIG. 1 is a flow chart of one implementation of a data migration process;

Like reference symbols in the various drawings indicate like elements.

DETAILED DESCRIPTION OF THE EMBODIMENTS

Figure 2:
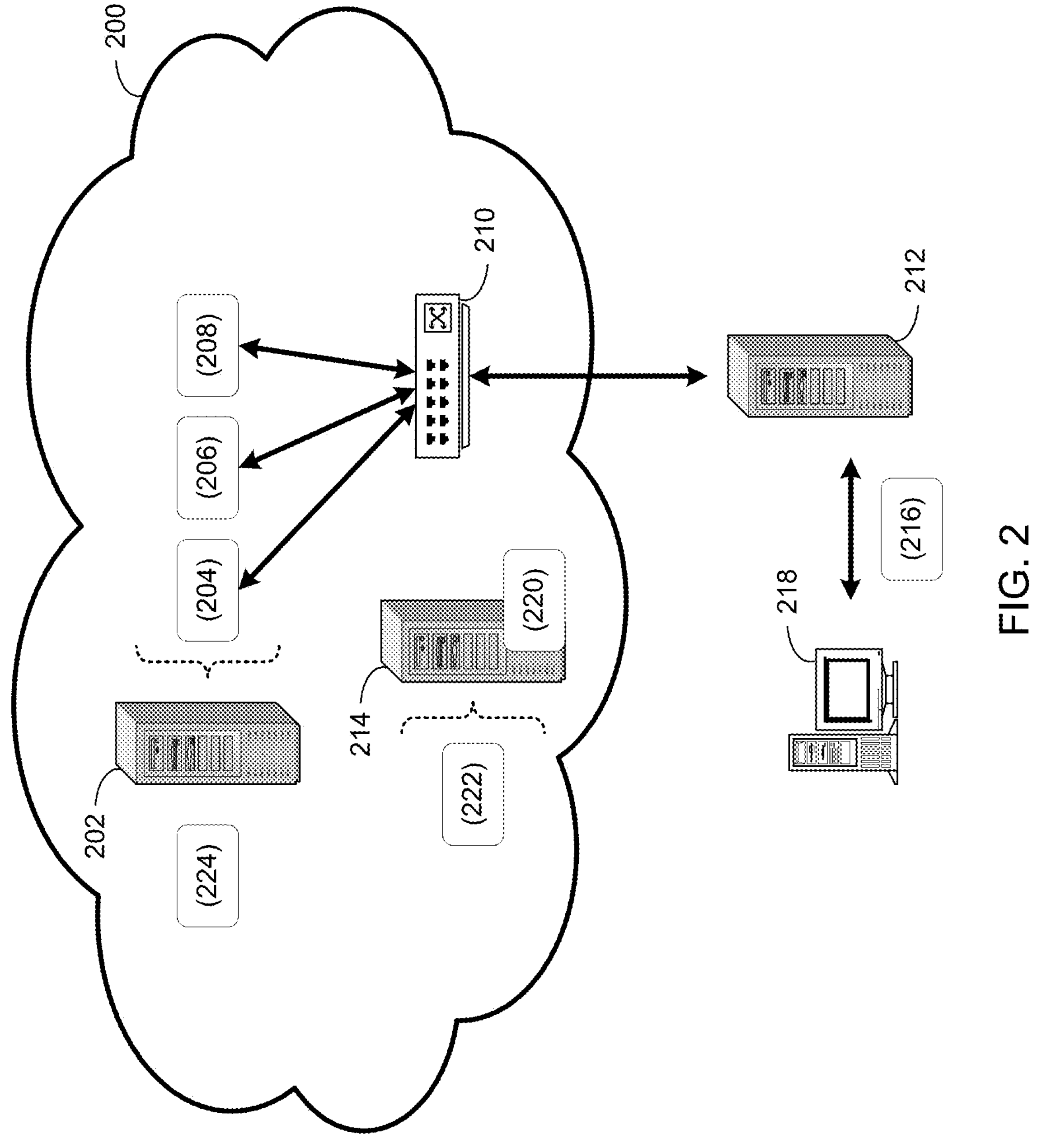
FIG. 2 is a diagrammatic view of a virtual network with an interim shadow mapping policy installed on a virtual network device.

Implementations of the present disclosure enable minimal data packet loss during migration of network routing to a software defined networking (SDN) appliance by: programming SDN policies on the SDN appliance; changing the provider address mapping for a bare-metal electronic device (i.e., a bare-metal computing device, a bare-metal networking device, and/or a bare-metal storage device) to point to the SDN appliance instead of pointing to the VXLAN switch, such that all the traffic for a user goes to the SDN appliance; and changing the VXLAN switch configuration to direct all of its outbound traffic to the SDN appliance, instead of sending it to the virtual network devices (e.g., virtual network hosts of various virtual machines, other SDN appliances, network devices, or any other device that participates in virtual networking with a direct network connection with the bare-metal server) directly. For example, users of bare-metal electronic devices (e.g., bare-metal hosts or bare-metal servers) that would like to enable SDN policies, and the higher scalability of routes offered by a SDN appliance need to migrate from a pre-SDN appliance configuration to a virtual network with the SDN appliance. When a migration is triggered to upgrade traffic routing using the SDN appliance, the data migration process performs this in a way that minimizes data packet loss, such that customers incur sub-second data path downtime because of the migration. The data migration process ensures that the migration is transparent to customer applications.

In a pre-SDN appliance configuration, the bare-metal device IP address is mapped to a Virtual extensible Local-Area Network (VXLAN) switch underlay provider IP address (i.e., address within a network used to route data packets between devices in a network), such that if a virtual machine wants to send data packets to the bare-metal electronic device, the traffic goes to the VXLAN switch on the underlay and the VXLAN switch then forwards the traffic to the bare-metal electronic device. When the bare-metal electronic device attempts to send data packets to a virtual machine, the VXLAN switch will first receive the traffic and then forward traffic on the underlay to a virtual network device, which will send it to the target virtual machine.

In a SDN appliance configuration, the bare-metal electronic device IP address is mapped to the SDN appliance's underlay provider IP Address. The VXLAN switch forwards all the traffic to the SDN appliance, instead of sending it to the virtual machine's virtual network device. If the virtual machine attempts to send data packets to the bare-metal electronic device, the traffic is sent to the SDN appliance, and the SDN appliance forwards the traffic to the VXLAN switch which forwards it to the bare-metal electronic device. If the bare-metal electronic device attempts to send data packets to a virtual machine, the traffic goes to the VXLAN switch which forwards it to the SDN appliance, and the SDN appliance sends the traffic to the address of the virtual network device. However, the process for migrating network traffic routing through the SDN appliance is subject to data packet loss (i.e., where data packets are dropped when network connections between virtual network devices and VXLAN switch are transitioned to the SDN appliance).

As will be described in greater detail below, implementations of the present disclosure provide for a minimal loss in data packets during migration to a SDN appliance configuration by processing a request to route network traffic between a virtual network device in a virtual network and a bare-metal electronic device using a software defined networking (SDN) appliance, where the virtual network device includes a virtual network host of various virtual machines, other SDN appliances, network devices, or any other device that participates in virtual networking with a direct network connection with the bare-metal server. In one example, the virtual network device is a virtual network host that includes one or more virtual machines and an existing direct network connection from outside of a cloud computing environment with a Virtual extensible Local-Area Network (VXLAN) switch that is coupled to a bare-metal electronic device (which will be migrated to the SDN appliance). Accordingly, any reference to a virtual network host described herein applies to and includes virtual network devices generally. An interim shadow mapping policy is installed on the virtual network host by virtual network agents to receive outgoing network traffic from a SDN appliance. Outgoing network traffic from the VXLAN switch is redirected to the SDN appliance which forwards the outgoing network traffic to the virtual network host. A new mapping policy update is installed on the virtual network host for routing incoming network traffic from the network host to the SDN appliance which forwards the incoming network traffic to the VXLAN switch. Accordingly, data migration process enables migration of data packets through a SDN appliance with minimal data packet loss by initially configuring a virtual network host to receive outgoing network traffic from the SDN appliance using the interim shadow mapping policy and by maintaining the existing network connection between the virtual network host and the VXLAN switch until the SDN appliance is configured for routing outgoing network traffic to the virtual network host.

The details of one or more implementations are set forth in the accompanying drawings and the description below. Other features and advantages will become apparent from the description, the drawings, and the claims.

The Data Migration Process:

Referring to FIGS. 1-4, data migration process 10 processes 100 a request to route network traffic between a virtual network host in a virtual network and a bare-metal electronic device using a software defined networking (SDN) appliance, where the virtual network host includes an existing direct network connection with a Virtual extensible Local-Area Network (VXLAN) switch coupled to a bare-metal electronic device. An interim shadow mapping policy is installed 102 on the virtual network host configuring the virtual network host to receive outgoing network traffic from a SDN appliance. Outgoing network traffic from the VXLAN switch is redirected 104 to the SDN appliance. A new mapping policy update is installed 106 on the virtual network host for routing incoming network traffic from the virtual network host to the SDN appliance. As will be described in greater detail below, by performing the actions of datapath transition process 10, the data packet loss is minimized during the transition of the datapath to a SDN appliance.

In some implementations, data migration process 10 processes 100 a request to route network traffic between a virtual network host in a virtual network and bare-metal electronic device using a software defined networking (SDN) appliance, where the virtual network host includes an existing direct network connection with a Virtual extensible Local-Area Network (VXLAN) switch coupled to a bare-metal electronic device (i.e., one or more network connections from the virtual network host and outside network traffic which comes via Express Route (i.e., a logical connection between an on-premises infrastructure and a cloud service within a cloud computing environment that exchanges network routes between cloud services and on-premises networks)/virtual private network (VPN) gateway to the VXLAN switch). A virtual network (e.g., virtual network 200) is a logical separation of a physical network into one or more virtual networks which are overlayed on the physical network underlay which allows multiple devices to communicate with each other as if they were on the same physical network, even if the devices are geographically separated. In some implementations, virtual network 200 is a portion of a cloud computing environment to provide isolation, security, and scalability for applications and services within the cloud computing environment. A virtual network host (e.g., virtual network host 202) is a server or other computing device that manages virtual machines, containers, user compute/storage such that the virtual network host runs virtual network agents which enable the virtual network host to participate in a virtual network. In some implementations, virtual network hosts use virtualization technology to partition physical hardware resources and to create virtual instances of network devices (e.g., routers, switches (e.g., Virtual extensible Local-Area Network (VXLAN) switches), firewalls, etc.). For example, the virtual network agents use virtualization technology and enable virtual machines to be part of a virtual network and get an Internet Protocol (IP) address on an overlay, and to tie the virtual machine into the physical network underlay so that a user's different resources can communicate with one another. Additionally, virtual network agents enforce various policies like firewall, private access, and other policies. In some implementations and as shown in FIG. 2, a virtual machine (e.g., virtual machines 204, 206, 208) is deployed on virtual network host 202. In this manner, description below of virtual machines 204, 206, 208 sending or receiving network traffic includes sending or receiving the network traffic using virtual network host 202 that maps the data packets to or from respective virtual machines. While FIG. 2 includes a single virtual network host (e.g., virtual network host 202), it will be appreciated that many virtual network hosts, each with a set of virtual machines interacting with a SDN appliance, and/or many on-premises/remote sites interacting with the bare-metal electronic device (using via Express Route/VPN gateway) are possible within the scope of the present disclosure.

A VXLAN switch (VXLAN switch 210) is a network switch that supports virtualized encapsulation and forwarding of data packets for communication between a virtual network host (e.g., virtual network host 202) and a bare-metal electronic device. For example, when a data packet is transmitted across virtual network 200, VXLAN switch 210 encapsulates the data packet within a VXLAN header that is used to forward the data packet using a destination IP address. When the data packet arrives at its destination, VXLAN switch 210 de-encapsulates the encapsulated data packet and forwards the data packet to its true destination using address resolution protocol (ARP) to determine a destination MAC address.

A bare-metal electronic device (e.g., bare-metal electronic device 212) is a physical electronic device that can perform computing, networking, and/or storage functions. Unlike virtual machines or virtual servers which execute on virtualization software on top of a host operating system, bare-metal electronic device 212 execute directly on hardware without intervening layers. In some implementations, this direct execution provides users with full control over the computing device's resources and configuration. As discussed above, virtual networks deployed within a cloud computing provider may be configured with various policies managed by a cloud computing environment provider. However, bare-metal electronic device 212 is generally unable to execute or enforce these policies because bare-metal electronic devices are unable to execute virtual agents and/or the hardware and/or software components of a cloud service provider to enforce these policies. Accordingly, a software defined network (SDN) appliance (e.g., SDN appliance 214) provides access to these policies without exposing the policies to modification by bare-metal electronic device 212.

A SDN is a network that includes network functions and services that are decoupled from underlying hardware and are implemented in software, allowing for flexibility, automation, and programmability. For example, in an SDN, administrators can dynamically control and manage network traffic flows, allocate resources, and enforce policies through centralized software controllers, rather than relying on manual configuration of individual network devices. A SDN appliance (e.g., SDN appliance 214) is a hardware device and/or software application that implements SDN functionalities within virtual network 200. SDN appliance 214 includes virtual network agents that manage traffic flows, and enforce network policies, and does so for bare-metal electronic device 212 which is not capable of network policy enforcement.

In some implementations, data migration process 10 processes 100 a request (e.g., request 216) to route network traffic between virtual network host 202 in a virtual network and bare-metal electronic device 212 using SDN appliance 214. Referring again to FIG. 2, in a pre-SDN appliance configuration, virtual machines 204, 206, 208 deployed using virtual network host 202 communicate with bare-metal electronic device 212 using VXLAN switch 210. However, bare-metal electronic device 212 is unable to enforce SDN policies defined within virtual network 200. Additionally, VXLAN switch 210 is also not able to enforce SDN policies like firewall rules and is only capable of basic routing withing virtual network 200. Accordingly, data migration process 10 receives request 216 (e.g., from computing device 218 operated by a user) to route network traffic between virtual network host 202 and bare-metal electronic device 212 using SDN appliance 214.

In one example, request 216 is a request to edit network features within a bare-metal electronic device resource provider application. In this example, request 216 includes programming a virtual network interface card (NIC) (e.g., virtual NIC 220) of SDN appliance 214 for receiving network traffic (e.g., incoming network traffic and outgoing network traffic) and programming SDN appliance 214 for enforcing SDN policies (e.g., SDN policy 222) once network traffic is routed through SDN appliance 214. As described above, SDN policies include quality of service (QOS) policies (i.e., policies that prioritize certain types of traffic over others to ensure particular applications receive threshold bandwidth and latency), access control policies (i.e., rules the control which users or devices are allowed to access specific network resources), traffic engineering policies (i.e., policies that optimize network traffic routing and load balancing), security policies (i.e., policies, such as firewall rules, encryption requirements, and/or intrusion detection, that enforce security measures to protect against unauthorized access, malicious attacks, and data breaches), bandwidth policies (i.e., policies that allocate network bandwidth dynamically based on application requirements, network traffic patterns, and/or network congestion), service chaining policies (i.e., policies that define a sequence of network services or functions that network traffic pass through), and/or virtual network segmentation policies (i.e., policies that generate isolated virtual networks within a shared physical infrastructure to provide network segmentation and multi-tenancy support).

In some implementations, data migration process 10 installs 102 an interim shadow mapping policy on the virtual network agents of the virtual network host for configuring the virtual network host to receive outgoing network traffic from a SDN appliance. An interim shadow mapping policy (e.g., interim shadow mapping policy 224) is a temporary migration specific mapping policy for routing data packets between an overlay user address to an underlay address which is subject to migration. In some implementations, the interim shadow mapping policy to be installed, is placed on all virtual network hosts (e.g., virtual machines 204, 206, 208 on virtual network host 202, and virtual machine 222 on virtual network host 214) that communicate with bare-metal electronic device 212. For example, interim shadow mapping policy 224 includes a mapping of the destination underlay address (i.e., SDN appliance 214 underlay address) mapped to bare-metal electronic device 212's overlay IP address. The primary mapping policy still maps the underlay address to the overlay IP address of VXLAN switch 210 within virtual network 200, but the shadow mapping introduces the underlay of SDN appliance 214 to prevent packet drops (i.e., when outgoing traffic is transmitted from an "unknown" SDN appliance 214).

In some implementations, interim shadow mapping policy is directional (i.e., with a mapping for traffic going from the source to the destination and a separate mapping for traffic going from the destination to the source). In some implementations, interim shadow mapping policy 224 is a unidirectional mapping for data packets being received from SDN appliance 214. As such, virtual network host 202 receiving interim shadow mapping policy 224 uses a current mapping policy for communicating with VXLAN switch 210 until interim shadow mapping policy 224 is activated and uses interim shadow mapping policy 224 for receiving outgoing network traffic from SDN appliance 214 after interim shadow mapping policy 224 is activated. In some implementations, virtual network host 202 activates the shadow policy in response to receiving a data packet that matches interim shadow mapping policy 224.

For example, in a pre-SDN configuration, virtual machines 204, 206, 208 route network traffic to bare-metal electronic device 212 by communicating with VXLAN switch 210 deployed in virtual network 200. As such, virtual network host 202 and/or virtual machines 204, 206, 208 are configured with a mapping policy that describes the connection between virtual machines 204, 206, 208 and VXLAN switch 210. In this example, the mapping policy describes how data packets received from VXLAN switch 210 (i.e., outgoing network traffic) are routed to virtual machines 204, 206, 208 and vice versa for incoming network traffic. Without this mapping policy, these data packets are dropped and/or subject to delayed processing. Accordingly, data migration process 10 installs 102 interim shadow mapping policy 224 on virtual network host 202 configuring virtual network host 202 to receive outgoing network traffic from SDN appliance 214. For example and in some implementations, interim shadow mapping policy 224 enables virtual network host 202 in virtual network 200 to establish a network connection with SDN appliance 214 (as shown by the directional arrows in FIG. 3 from SDN appliance 214 to virtual machines 204, 206, 208).

Figure 3:
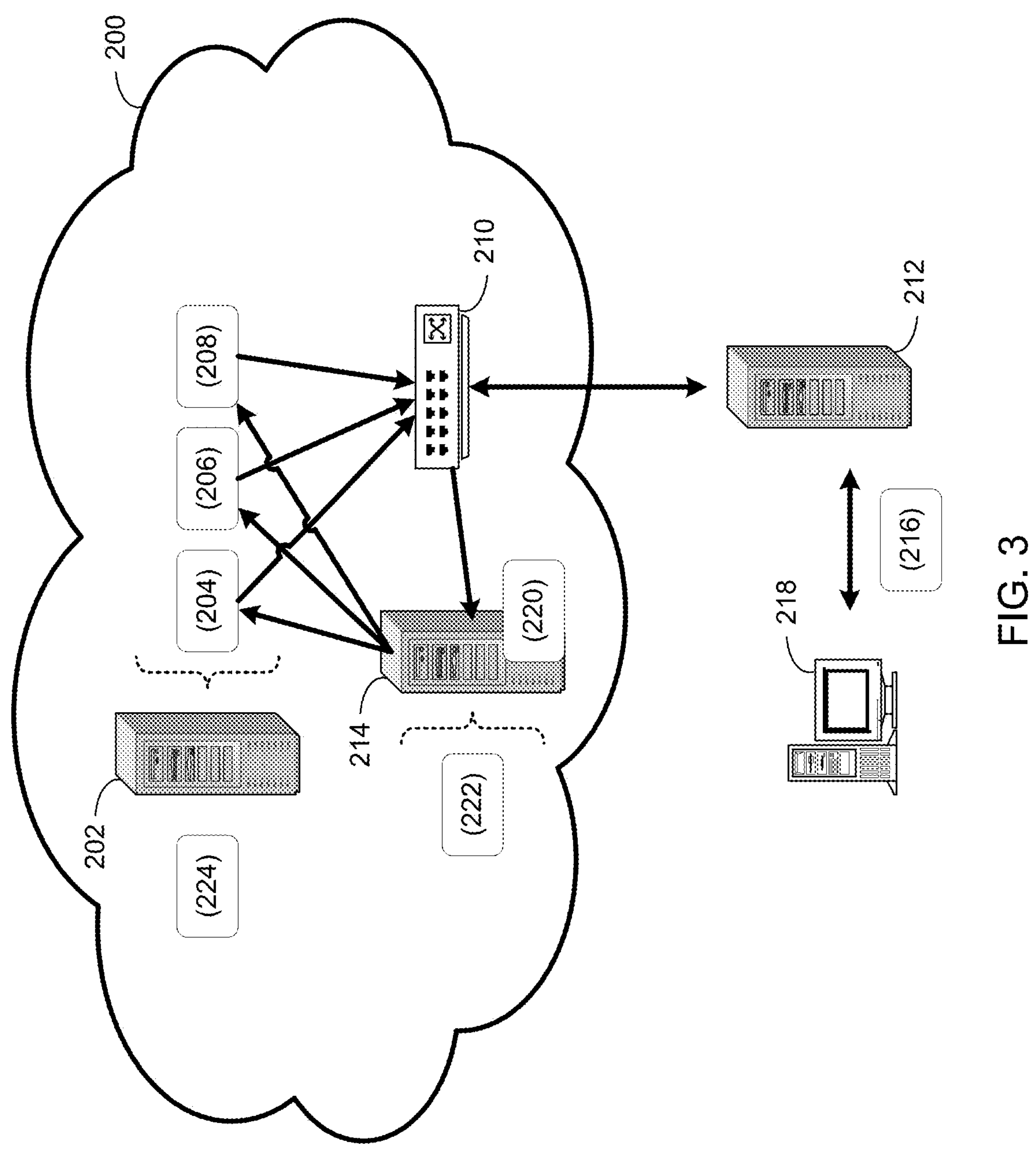
FIG. 3 is a diagrammatic view of the virtual network with a software defined networking (SDN) appliance configured to route outgoing network traffic from a bare-metal electronic device to the virtual network device.
Figure 4:
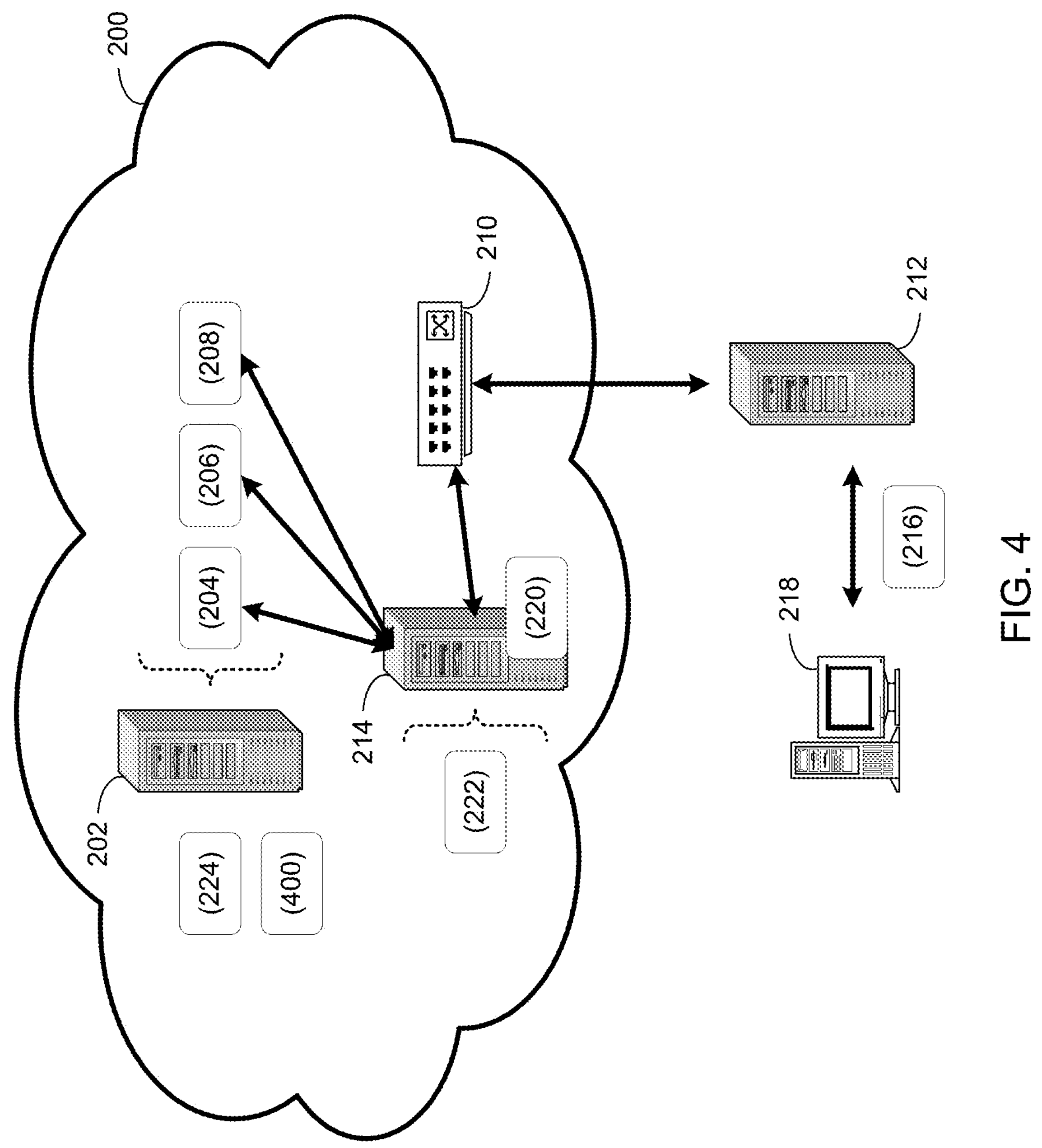
FIG. 4 is a diagrammatic view of the virtual network with all incoming and outgoing network traffic routed between the virtual network device and the bare-metal electronic device through the SDN appliance.

In some implementations, data migration process 10 forwards 108 incoming network traffic from the virtual machine to the VXLAN switch using the existing direct network connection with the VXLAN switch coupled to the bare-metal electronic device after installing the interim shadow mapping policy. For example, with interim shadow mapping policy 224 installed 102 on virtual network host 202, virtual network host 202 continues to forward 108 incoming network traffic to VXLAN switch 210 as usual per the pre-SDN appliance configuration. In this manner and as shown in FIG. 3 with unidirectional arrows from virtual machines 204, 206, 208 to VXLAN switch 210 for incoming network traffic and with unidirectional arrows from SDN appliance 214 to virtual machines 204, 206, 208, interim shadow mapping policy 224 allows virtual machines 204, 206, 208 to receive outgoing network traffic from SDN appliance 214 while forwarding 108 incoming network traffic from virtual machines 204, 206, 208 to VXLAN switch 210. With interim shadow mapping policy 224, data migration process 10 enables virtual network host 202 to communicate with SDN appliance 214, such that when network traffic comes from SDN appliance 214 instead of VXLAN switch 210, virtual network host 202 performs a lookup for SDN appliance 214 in its known mappings. While SDN appliance is unknown in the previous mapping policy, SDN appliance is defined in interim shadow mapping policy 224. Accordingly, the traffic is allowed to continue to virtual machines 204, 206, 208 without dropping data packets during the migration to SDN appliance 214.

In some implementations, when the first data packet is received by virtual network host 200 from bare-metal electronic device 212 (i.e., outgoing traffic), such that it came from SDN appliance 214's underlay IP, interim shadow mapping policy 224 is activated so that subsequent data packets go to SDN appliance 214 as per the shadow mapping instead of the primary mapping, thereby causing data packets from the virtual network host to go to SDN appliance 214 as per the shadow mapping, instead of going to VXLAN switch 210, as per the primary mapping policy.

In some implementations, data migration process 10 redirects 104 outgoing network traffic from the VXLAN switch to the SDN appliance. Redirecting 104 outgoing network traffic from VXLAN switch 210 the SDN appliance 214 includes configuring outgoing network traffic from VXLAN switch 210 to SDN appliance 214 instead of to virtual machines 204, 206, 208. For example, data migration process 10 notifies VXLAN switch 210's configuration agent to redirect traffic to SDN appliance 214, such that the VXLAN switch 210 will no longer send traffic directly to virtual machines 204, 206, 208 in virtual network 200, but rather to send the outgoing network traffic to SDN appliance 214. In some implementations, redirecting 104 outgoing network traffic from VXLAN switch 210 includes re-programing NIC 220 before the traffic change, so that no data packets from the outgoing traffic are dropped. For example, if outgoing network traffic is redirected 104 before NIC 220 is programmed, SDN appliance 214 drops the traffic. Accordingly, the sequencing of actions in datapath transition process 10 prevent datapath impact by minimizing or preventing data packet loss.

In some implementations, data migration process 10 routes 110 the outgoing network traffic received at the SDN appliance to the virtual network host. For example, with NIC 220 configured to send outgoing network traffic received at SDN appliance 214, data migration process 10 routes 110 outgoing network traffic to virtual network host (e.g., virtual machines 204, 206, 208 on virtual network host 202). In some implementations, data migration process 10 removes or deletes the previous network connections or routes between VXLAN switch 210 and virtual network host 202 (e.g., between VXLAN switch 210 and virtual machines 204, 206, 208).

In some implementations, routing 110 the outgoing network traffic includes enforcing 112 a SDN policy on the outgoing network traffic. For example, by sending outgoing network traffic to SDN appliance 214, data migration process 10 is able to enforce 112 all SDN policies (e.g., SDN policy 222) defined therein on outgoing traffic routed to the virtual network host (e.g., virtual machines 204, 206, 208 on virtual network host 202).

In some implementations, data migration process 10 modifies the provider address mapping for bare-metal electronic device 212 to point to the address of the SDN appliance 214 instead pointing to the underlay provider address of VXLAN switch 210. For example, after the outgoing network traffic is redirected 104 from VXLAN switch 210 the SDN appliance 214 as described above, data migration process 10 modifies the provider address mapping for bare-metal electronic device 212 to point to the address of the SDN appliance 214 instead pointing to the underlay provider address of VXLAN switch 210. In this manner, the bare-metal electronic device provider address mapping is modified after the outgoing network traffic is already being redirected to the SDN appliance. As shown in FIG. 3, this results in triangle traffic routing where virtual network host 202 sends incoming network traffic as per its mapping directly to VXLAN switch 210, and the response to that network traffic goes from bare-metal electronic device 212 to VXLAN switch 210, and from VXLAN switch 210 to SDN appliance 214 where SDN appliance 214 enforces SDN policy 222 on one direction of the traffic and then forwards the traffic to virtual network host 202. As described above, this redirecting continues until interim shadow mapping policy 224 is activated. Once interim shadow mapping policy 224 is activated, subsequent data packets from incoming traffic are sent directly to the underlay of SDN appliance 214 instead of VXLAN switch 210.

In some implementations, data migration process 10 installs 106 a new mapping policy update on the virtual network host for routing incoming network traffic from the virtual network host to the SDN appliance. For example, and referring also to FIG. 4, data migration process 10 installs 106 a new mapping policy update (e.g., new mapping policy update 400) on virtual network host 202 by pushing new mapping policy update 400 that configures virtual network host 202 to send networking traffic from virtual network host 202 (e.g., virtual machines 204, 206, 208) to SDN appliance 214 (instead of VXLAN switch 210). New mapping policy update 400 also configures virtual network host 202 to receive outgoing network traffic from SDN appliance 214. Accordingly and in some implementations, data migration process 10 removes interim shadow mapping policy 224 on virtual network host 202.

In some implementations, routing the incoming network traffic includes enforcing 114 a SDN policy on the incoming network traffic. For example, with incoming network traffic being routed from virtual network host 202 (e.g., from virtual machines 204, 206, 208), data migration process 10 enforces 114 SDN policy 222 on the incoming network traffic. In this manner, data migration process 10 is able use SDN appliance 214 to enforce 114 SDN policies (e.g., SDN policy 222) on incoming network traffic and outgoing network traffic between virtual machines 204, 206, 208 and bare-metal electronic device 212 with minimal data packet loss during migration of routing through SDN appliance 214.

In some implementations, data migration process 10 removes 116 the existing direct network connection between the virtual network host and the VXLAN switch. For example and using new mapping policy update 400, data migration process 10 removes 118 existing direct network connections between virtual network host 202 and VXLAN switch 210 (shown in FIG. 3 as unidirectional arrows from virtual machines 204, 206, 208 and VXLAN switch 210). In this manner, all network traffic is routed using SDN appliance 214 which enforces SDN policy 222 on bare-metal electronic device 212.

Figure 5:
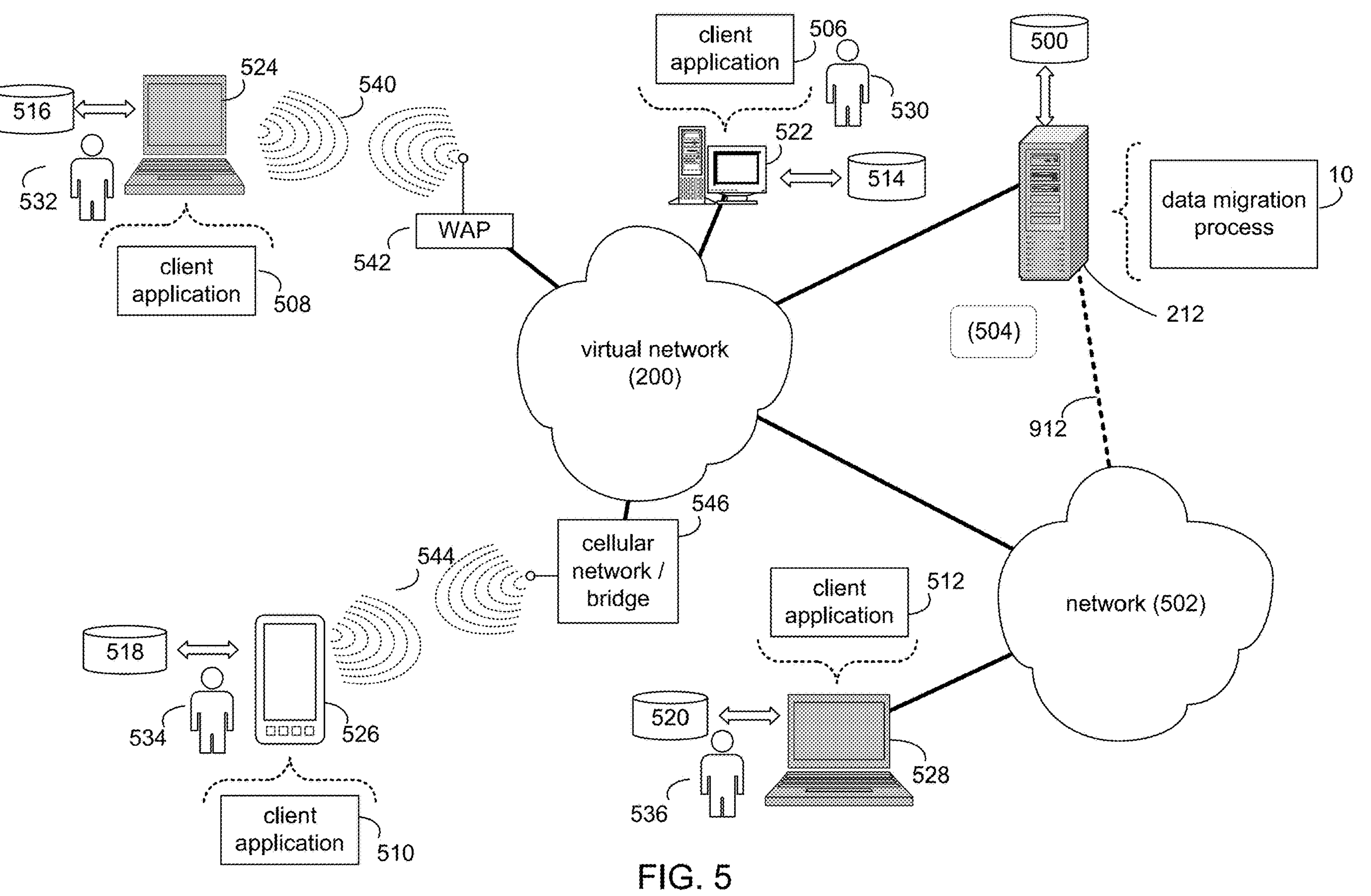
FIG. 5 is a diagrammatic view of computer system and the data migration process coupled to a distributed computing network.

System Overview:

Referring to FIG. 5, a data migration process 10 is shown to reside on and is executed by bare-metal electronic device 212, which is connected to virtual network 200. The various components of bare-metal electronic device 212 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data migration process 10, which are stored on storage device 500 included within bare-metal electronic device 212, are executed by one or more processors (not shown) and one or more memory architectures (not shown) included within bare-metal electronic device 212. Storage device 500 may include: a hard disk drive; an optical drive; a RAID device; a random-access memory (RAM); a read-only memory (ROM); and all forms of flash memory storage devices. Additionally or alternatively, some portions of the instruction sets and subroutines of data migration process 10 are stored on storage devices (and/or executed by processors and memory architectures) that are external to bare-metal electronic device 212.

In some implementations, virtual network 200 includes one or more secondary networks (e.g., network 502), examples of which include: a local area network; a wide area network; or an intranet.

Various requests (e.g., request 504) are sent from client applications 506, 508, 510, 512 to bare-metal electronic device 212. Examples of request 504 include data write requests (e.g., a request that content be written to bare-metal electronic device 212) and data read requests (e.g., a request that content be read from bare-metal electronic device 212).

The instruction sets and subroutines of client applications 506, 508, 510, 512, which may be stored on storage devices 514, 516, 518, 520 (respectively) coupled to client electronic devices 522, 524, 526, 528 (respectively), may be executed by one or more processors (not shown) and one or more memory architectures (not shown) incorporated into client electronic devices 522, 524, 526, 528 (respectively). Storage devices 514, 516, 518, 520 may include: hard disk drives; tape drives; optical drives; RAID devices; random access memories (RAM); read-only memories (ROM), and all forms of flash memory storage devices. Examples of client electronic devices 522, 524, 526, 528 include personal computer 522, laptop computer 524, smartphone 526, laptop computer 528, a server (not shown), a data-enabled, and a dedicated network device (not shown). Client electronic devices 522, 524, 526, 528 each execute an operating system.

Users 530, 532, 534, 536 may access bare-metal electronic device 212 directly through virtual network 200 or through secondary network 502. Further, bare-metal electronic device 212 may be connected to virtual network 200 through secondary network 502, as illustrated with a link line. While four users are shown accessing bare-metal electronic device 212, it will be appreciated that any number of users can access bare-metal electronic device 212 within the scope of the present disclosure.

The various client electronic devices may be directly or indirectly coupled to virtual network 200 (or network 502). For example, personal computer 926 is shown directly coupled to virtual network 200 via a hardwired network connection. Further, laptop computer 528 is shown directly coupled to network 502 via a hardwired network connection. Laptop computer 524 is shown wirelessly coupled to virtual network 200 via wireless communication channel 540 established between laptop computer 528 and wireless access point (e.g., WAP) 542, which is shown directly coupled to virtual network 200. WAP 542 may be, for example, an IEEE 802.11a, 802.11b, 802.11 g, 802.11n, Wi-Fi®, and/or Bluetooth® device that is capable of establishing a wireless communication channel 540 between laptop computer 524 and WAP 542. Smartphone 930 is shown wirelessly coupled to virtual network 200 via wireless communication channel 544 established between smartphone 526 and cellular network/bridge 546, which is shown directly coupled to virtual network 200.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

receiving a request to route network traffic between a virtual network device in a virtual network and a bare-metal electronic device using a software defined networking (SDN) appliance, wherein the virtual network device includes an existing direct network connection with a Virtual extensible Local-Area Network (VXLAN) switch coupled to the bare-metal electronic device;

installing an interim shadow mapping policy on the virtual network device, the interim shadow mapping policy configuring the virtual network device to receive network traffic from the SDN appliance while continuing to direct network traffic from the virtual network device to the VXLAN switch;

redirecting network traffic from the VXLAN switch, forwarded from the bare-metal electronic device, to the SDN appliance; and installing a new mapping policy update on the virtual network device for routing network traffic directed to the bare-metal electronic device from the virtual network device to the SDN appliance.

2. The computer-implemented method of claim 1, further comprising:

forwarding network traffic received from the virtual network device to the VXLAN switch using the existing direct network connection with the VXLAN switch coupled to the bare-metal electronic device after installing the interim shadow mapping policy.

3. The computer-implemented method of claim 1, wherein the interim shadow mapping policy enables the virtual network device in the virtual network to establish a network connection with the SDN appliance.

4. The computer-implemented method of claim 1, further comprising:

routing the network traffic received at the SDN appliance from the bare-metal electronic device to the virtual network device.

5. The computer-implemented method of claim 1, wherein routing the network traffic from the bare-metal electronic device includes enforcing a SDN policy on the network traffic from the bare-metal electronic device.

6. The computer-implemented method of claim 1, wherein routing the network traffic from the virtual network device includes enforcing a SDN policy on the network traffic from the virtual network device.

7. The computer-implemented method of claim 1, further comprising:

removing the interim shadow mapping policy on the virtual network device.

8. The computer-implemented method of claim 1, further comprising:

removing the existing direct network connection between the virtual network device and the VXLAN switch.

9. A computing system comprising:

a memory; and a processor configured to:

receive a request to route network traffic between a virtual network host in a virtual network and a bare-metal electronic device using a software defined networking (SDN) appliance, wherein the virtual network host includes an existing direct network connection with a Virtual extensible Local-Area Network (VXLAN) switch coupled to the bare-metal electronic device, install an interim shadow mapping policy on the virtual network host, the interim shadow mapping policy configuring the virtual network host to receive network traffic from the SDN appliance while continuing to direct network traffic from the virtual network host to the VXLAN switch, redirect network traffic from VXLAN switch, forwarded from the bare-metal electronic device, to the SDN appliance, install a new mapping policy update on the virtual network host for routing network traffic directed to the bare-metal electronic device from the virtual network host to the SDN appliance, and route the network traffic from the virtual network host and the network traffic forwarded from the bare-metal electronic device using the SDN appliance.

10. The computing system of claim 9, wherein the processor is further configured to:

forward traffic received from the virtual network host to the VXLAN switch using the existing connection with the VXLAN switch coupled to the bare-metal electronic device after installing the interim shadow mapping policy.

11. The computing system of claim 9, wherein the interim shadow mapping policy enables the virtual network host in the virtual network to establish a network connection with the SDN appliance.

12. The computing system of claim 9, wherein the processor is further configured to:

route the network traffic received at the SDN appliance from the bare-metal electronic device to the virtual network host.

13. The computing system of claim 9, wherein to route the network traffic from the bare-metal electronic device the processor is further configured to:

enforce a SDN policy on the network traffic from the bare-metal electronic device.

14. The computing system of claim 9, wherein to route the network traffic from the virtual network host, the processor is further configured to:

enforce a SDN policy on the network traffic from the virtual network host.

15. The computing system of claim 9, wherein the processor is further configured to:

remove the interim shadow mapping policy on the virtual network host.

16. The computing system of claim 9, wherein the processor is further configured to:

remove the existing direct network connection between the virtual network host and the VXLAN switch.

17. A non-transitory computer readable medium having instructions stored thereon which, when executed by a processor, cause the processor to:

receive a request to route network traffic between a virtual network host in a virtual network and a bare-metal electronic device using a software defined networking (SDN) appliance, wherein the virtual network host includes a virtual machine and an existing direct network connection with a Virtual extensible Local-Area Network (VXLAN) switch coupled to the bare-metal electronic device;

install an interim shadow mapping policy on the virtual network host, the interim shadow mapping policy configuring the virtual network host to receive network traffic from the SDN appliance while continuing to direct network traffic from the virtual network host to the VXLAN switch;

redirect network traffic from VXLAN switch, forwarded from the bare-metal electronic device, to the SDN appliance;

install a new mapping policy update on the virtual network host for routing network traffic from the virtual network host to the SDN appliance;

remove the interim shadow mapping policy on the virtual network host; and route the network traffic from the virtual network host and the network traffic forwarded from the bare-metal electronic device using the SDN appliance.

18. The non-transitory computer readable medium of claim 17, wherein the processor is further configured to:

forward network traffic from the virtual network host to the VXLAN switch using the existing connection with the VXLAN switch coupled to the bare-metal electronic device after installing the interim shadow mapping policy.

19. The non-transitory computer readable medium of claim 17, wherein the interim shadow mapping policy enables the virtual network host in the virtual network to establish a network connection with the SDN appliance.

20. The non-transitory computer readable medium of claim 17, wherein the processor is further configured to:

route the network traffic received at the SDN appliance from the bare-metal electronic device to the virtual network host.

* * * * *